United States Patent [19]

Haase et al.

[11] Patent Number: 4,981,675

[45] Date of Patent: * Jan. 1, 1991

[54] POLYMERIC BASIC ALUMINUM SILICATE-SULPHATE

[75] Inventors: Dieter Haase, Ste-Catherine; Nelu Spiratos, LaPrairie; Carmel Jolicoeur, Deauville of Canada

[73] Assignee: Handy Chemicals Ltd., Quebec, Canada

[*] Notice: The portion of the term of this patent subsequent to Oct. 31, 2006 has been disclaimed.

[21] Appl. No.: 266,854

[22] Filed: Nov. 3, 1988

[51] Int. Cl.$^5$ .......................... C01F 7/74; C01F 7/02; B01D 21/01; B03D 3/00

[52] U.S. Cl. ...................... 423/556; 210/723; 423/625; 423/629

[58] Field of Search ................ 423/556, 625, 629

[56] References Cited

U.S. PATENT DOCUMENTS

| | | | |
|---|---|---|---|
| 2,310,009 | 2/1943 | Baker | 210/648 |
| 2,999,734 | 9/1961 | Weber et al. | 423/556 |
| 3,535,259 | 10/1970 | Hurioka | 423/556 |
| 3,963,640 | 6/1976 | Smith | 252/716 |
| 4,024,087 | 5/1977 | Lainer et al. | 423/556 |
| 4,122,031 | 10/1978 | Smith | 252/313 S |
| 4,284,611 | 8/1981 | Gancy et al. | 423/556 |
| 4,536,384 | 8/1985 | Lindahl | 423/556 |
| 4,563,342 | 1/1986 | Gunnarsson et al. | 423/556 |
| 4,566,986 | 1/1986 | Waldmann | 423/600 |
| 4,877,597 | 10/1989 | Haase et al. | 423/556 |

FOREIGN PATENT DOCUMENTS

| | | |
|---|---|---|
| 1123306 | 5/1982 | Canada . |
| 1203364 | 4/1986 | Canada . |
| 1203664 | 4/1986 | Canada . |
| 1203665 | 4/1986 | Canada . |
| 2229895 | 12/1972 | Fed. Rep. of Germany . |
| 2554218 | 8/1977 | Fed. Rep. of Germany ...... 423/550 |
| 1399598 | 7/1975 | United Kingdom . |

*Primary Examiner*—Gary P. Straub
*Attorney, Agent, or Firm*—Oblon, Spivak, McClelland, Maier & Neustadt

[57] ABSTRACT

A polynucleate hydroxy silicate-sulphate compound having the following average composition of the general formula:

$$Al_A(OH)_B(SO_4)_C(SiO_X)_D(H_2O)_E$$

wherein
A is 1.0
B ranges from 0.75 to 2.0
C ranges from 0.30 to 1.12
D ranges from 0.005 to 0.1
X is greater than 2.0 but less or equal to 4.0 such that $$3 = B + 2C + 2D(X-2)$$

E is 1.5 to 4 when the product is in solid form; and
E is larger than 4 when the product is in aqueous form.

15 Claims, No Drawings

POLYMERIC BASIC ALUMINUM SILICATE-SULPHATE

FIELD OF THE INVENTION

The present invention relates to novel polymeric basic aluminum silicate-sulpate and to a process for their preparation. These products are useful in industries such as: water treatment, pulp and paper, or wherever an aluminum hydroxide gel system resulting from such a polymer can be employed.

BACKGROUND OF THE INVENTION

Various aluminum containing compounds are used as precipitating agents in sewage treatment plants. One of the most widely used chemicals for the treatment of water is aluminum sulplate, widely known in the trade as Alum. These compounds are specifically used as flocculating and coagulating agents in water purification treatment. Although Alum has been extensively used, it presents several drawbacks namely its poor performances at low temperature, its high alkalinity requirements and potentially high residual soluble aluminum compounds.

The recent development of basic poly aluminum sulphate has provided products which overcome most of the difficulties mentioned for Alum. However, a major problem associated with the use of basic aluminum sulphate is the stability of the solutions. The difficulty is that aqueous solutions of basic aluminum sulphate tend to form a precipitate of metal salt or become cloudy partly gelatinous after only a short period of time. When this occurs, these solutions can often no longer be used or are less effective in most applications. Therefore, unless they are stabilized in some manner, basic aluminum sulphate solutions must be used within a very short time of their preparation. This is clearly a serious disadvantage because most industries require chemicals which are stable over a long period of time so that they can be stored in reasonable quantities and used as and when desired.

The traditional methods of preparations of polyaluminum sulphate solutions usually follow a partial neutralization of aluminum sulphate with hydroxyl groups from lime, caustic soda, soda ash, ammonium hydroxide or other alkali sources to a pH of approximately 3.5-4.3, typically 3.8, since aluminum hydroxide is not precipitated below a 3.8 pH.

Stablizers such as phosphates or chlorides may also be added to partially replace sulphate groups, or alternatively organic complexing agents such as sodium heptonate, citric acid, sorbitol, sodium citrate, sodium tartrate, sodium gluconate and the like may be added separately to stabilize the aqueous aluminum salt. The stabilization and neutralization techniques are examplified in Canadian Patents Nos. 1,123,306, 1,203,364, 1,203,664 and 1,203,665, as well as in U.S. Pat. Nos. 4,284,611 and 4,536,384.

One will usually encounter an important by-product loss when using the processes described in the prior art. Compounds such as calcium or sodium sulphate and ammonium sulphate in concentrations that will range from 20 to 30% by weight will typically be produces as by-products. The exact percentage of loss will depend on the basicity of the solution produced and on the source of alkali used. Also, mixing and possible filtration problems occur when lime is used as the alkali. Finally, possible crystallization problems may occur when sodium sulphate is formed as a by-product.

Finally, one of the most important problems encountered in the storage of an aluminum based product such as poly aluminum sulphate is the precipitation of substantial amounts of aluminum hydroxide within 2 to 30 days following the preparation of the desired product, whether it is stablized or not. Although the rate of hydrolysis leading to the precipitation of aluminum hydroxide will vary depending on the method and temperature of preparation as well as the choice of the stabilizer, it is in most cases a major problem.

Therefore, it would be highly desirable to provide an aluminum based product useful as a water treating agent and storable for long periods of time without encountering major losses in efficiency.

SUMMARY OF THE INVENTION

In accordance with the present invention, there is provided a polynucleate aluminum hydroxy silicate-sulphate compound having the following average composition of the general formula:

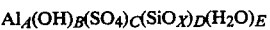

$$Al_A(OH)_B(SO_4)_C(SiO_X)_D(H_2O)_E$$

wherein
A is 1.0;
B ranges from 0.75 to 2.0;
C ranges from 0.30 to 1.12;
D ranges from 0.005 to 0.1; and
X is greater than 2.0 but less than or equal to 4.0 such that $$3 = B + 2C + 2D(X-2)$$

E is 1.5 to 4 when the product is in solid form; and
E is larger than 4 when the product is in aqueous form.

Also within the scope of the present invention is a process for the preparation of the product of the present invention. This process comprises reacting aluminum sulphate with an alkali silicate and an alkali aluminate under high shear mixing and recovering the desired product.

The process of the present invention yields a product presenting enhanced stability properties as well as performances equal to Alum when the water to be treated has a temperature close to room temperature and performances superceding Alum when the temperature of the water to be treated is lower than or equal to 16° C. Various embodiments of the present invention will become more apparent by refering to the following description.

DETAILED DESCRIPTION OF THE INVENTION

The present invention relates to stabilized aqueous solutions of polymeric basic aluminum silicate sulphate. These solutions are typically useful as flocculating agents, fixing agents, dewatering agents and coagulant aids. The flocculation properties of the product of the present invention supercede aluminum sulphate when water having a temperature of 16° C. or less is treated and in most cases equal to aluminum sulphate when the temperature of the water is higher than 16° C.

The Product

The novel product that is contemplated in the context of the present invention has the following average composition of the general formula:

$$Al_A(OH)_B(SO_4)_C(SiO_X)_D(H_2O)_E$$

wherein
A is 1.0;
B ranges from 0.75 to 2.0; preferably 1.2–1.8
C ranges from 0.30 to 1.12; preferably 0.53–0.90
D ranges from 0.005 to 0.1; preferably 0.033–0.070 and
X is greater than 2.0 but less than or equal to 4.0, preferably less than or equal to such that $$3 = B + 2C + 2D(X-2)$$

E is 1.5 to 4 when the product is in solid form; and
E is larger than 4 when the product is in aqueous form.

The distinguishing feature of the product of the present invention over other polymeric aluminum products prepared in the prior art is the presence of silicate species that are bonded to the polymer. These silicate species play an important role in the improved stability of the product over other existing poly aluminum sulphate compounds.

It should be noted that a product to which other additions of other anions such as phosphates, chlorides, acetates, borates, carbonates or salts of orgainc or inorganic acids when added to the basic alum-silicate complex should not be considered outside the scope of the present invention.

Furthermore, the product may also include substantial amounts of other cations such as those for example, of iron contained in Alum when it is prepared from bauxite. Other cations whether introduced unintentionally or otherwise may include magnesium, calcium, zinc and zirconium. It remains, however, that the silicate species bonded into the poly aluminum sulphate species as described before is the product contemplated in the context of the present invention but the cations such as those mentioned above may also be included in the complex of the present invention.

The Process

The product of the present invention is prepared in accordance with a one-step novel process in which aluminum sulphate, an alkali silicate and an alkali aluminate are reacted together in an aqueous solution under high shear mixing to yield the desired product.

a. The Starting Materials

As mentioned above, the basic starting materials required are aluminum sulphate, an alkali silicate as well as an alkali aluminate. With regard to the alkali silicate, the use of any suitable alkali silicate may be contemplated, although the use of sodium silicate is preferred in the context of the present invention. With regard to the source of alkali aluminate, again, any suitable source of alkali aluminate can be forseen although sodium aluminate appears to be the preferred product.

As for the concentrations of the various starting materials, Alum should be present in concentrations varying between 5666 to 8719 parts by weight and the concentration of sodium silicate will vary between 17 and 355 while the concentration of sodium aluminate could range between 639 and 1704 parts wherein Alum contains 28% $Al_2(SO_4)_3$, sodium silicate contains 28.7% $SiO_2$ and sodium aluminate 24.0% $Al_2O_3$ as well as 6% free NaOH.

b. The Reaction Conditions

The products of the present invention are made under high shear mixing in order to achieve a high $Al_2O_3$ content and a clear final product in a simple and convenient one-step process.

In a preferred embodiment, from 118 to 236 parts of a liquid sodium silicate, contained in from 983 to 1967 parts of additional water, are added to from 6154 to 7620 parts of liquid Alum wherein sodium silicate before dilution contains 28.7% $SiO_2$ and an $SiO_2$ to $Na_2O$ ratio of 3.22:1.0 and Alum contains 28% $Al_2(SO_4)_3$. The mixture is then cooled to a temperature ranging from 10° to 20° C. and under high shear mixing which can produce a peripheral velocity of from 20 to 90 feet/sec., from 1022 to 1534 parts of sodium aluminate contained in from 1244 to 1867 parts of additional water may be slowly added over a period of time ranging from ½ to ¾ hr. The sodium aluminate contains 24.0% $Al_2O_3$ before dilution. The resulting mixture may than be held at a temperature ranging from 10° to 20° C. for a period of time ranging from ½ to ¾ hr. After that mixing period, temperature is slowly increased to 50° to 70° C. over a period of time ranging from 1 to 2 hrs. The temperature is then held for ¾ to 1½ hrs. or until the mixture becomes clear. After the mixture has become clear, the product can be cooled and stored until used.

The product obtained from this method is a clear or slightly turbid readily filtrable product. The use of high shear mixers or homogenizers enables the formation of the reactive $Al(OH)_3$ gel at high solids content and yields a final transparent liquid product containing as much as 7–10% $Al_2O_3$. These parameters are described in copending U.S. application Ser. No. 07/262,320 filed Oct. 25, 1988 Dieter Haase and Nelu Spiratos, inventors. With the silicate being incorporated into the polymer, one can expect a storage time of at least 3 months without any substantial loss of product stability. The storage temperature of the product should be in the range of 20° to 25° C., or preferably less for increased shelf life. Furthermore, the absence of silicate in the final product yields a solution that shows signs of aluminum hydroxide precipitation as early as 2–3 weeks after preparation. After 3 months, it shows large amounts of precipitation indicating substantial losses of active $Al_2O_3$ from the liquid.

Another important advantage of the product of the present invention is the fact that it is more alkaline than Alum. As a result of this property, the treated water will demonstrate a higher alkalinity in every case. This considerable advantage reduces the need to effect final pH corrections of effluent drinking water, and may help to prevent corrosion of effluent pipes.

The present invention will be more readily illustrated by refering to the following examples. It is by no means intended to limit the scope of protection of these examples.

EXAMPLE 1

Preparation of Polymeric Basic Aluminum Silicate-Sulphate

To a jacketed 1 liter flask were added 700 parts of liquid Alum (28% $Al_2(SO_4)_3$. Next were added 18.4 parts of sodium silicate (28.7% $SiO_2$ and $SiO_2$ to $Na_2O$ is 3.22:1.0) contained in 150 parts of additional water. The mixture was cooled to approximately 15° C. and under high shear mixing 129 parts of liquid sodium aluminate (24.0% $Al_2O_3$) contained in 157 parts water were slowly added over one half hour. The aluminum hydroxide gel mixture was held at 15° C. for one half hour at which time the temperature was slowly increased to 65° over 2 hours. It was held for one and a half hour at 65° C. until the mixture became clear, and was then cooled.

Consequently, when a 50% basic solution in which $B=1.5$, $D=0.05$ and $X=2.311$ is produced, the following reaction takes place:

$$1.25\ Al_2(SO_4)_3 + 0.062\ (Na_2O\ .\ 3.22\ SiO_2) +$$

$$0.75\ Na_2Al_2O_4 + 3H_2O \longrightarrow$$

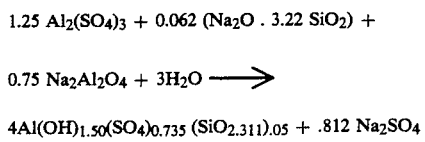

$$4Al(OH)_{1.50}(SO_4)_{0.735}(SiO_{2.311})_{.05} + .812\ Na_2SO_4$$

The physical and chemical characteristics of the final product are as follows:
Colour: colourless
Appearance: slightly turbid liquid
pH: 3.7
Specific gravity: 1.28
$Al_2O_3$% wt: 8.3% (a small increase over theoretical due to evaporation loss)
Basicity: 50%
Sodium sulphate: 5.7%

EXAMPLE 2

The procedure of Example 1 was repeated using 24 parts of sodium silicate in 200 parts of water in order to obtain a final concentration of $Al_2O_3$ of 7.5% and a value for D of 0,065.

The product obtained had the following physical and chemical characteristics:
Colour: colourless
Appearance: slightly tubid liquid
pH: 3.7
Specific gravity: 1.21
$Al_2O_3$% wt.: 7.5%
Basicity: 50%
Sodium sulphate: 5.2%

Evidence of Silicate Incorporation in the Product

An important aspect of the present invention is the fact that the silicate species are bonded into the product. We show three separate methods in which this is substantiated.

(1) Physical Evidence

It was found that the addition of silicate to Alum before the polymer is formed (as in the above examples) yields a clear filterable product, while the addition of silicate under identical conditions, to the already made basic Alum polymer yields a turbid non filterable mixture containing silica gel.

(2) Procedure for Evaluation of Silicon Content in "FLOC"

A—Hydrolysis of Polymeric Aluminum Silicate-Sulphate

To 1 liter of tap water at 20° C. (pH adjusted to 7.5 with NaOH), 10 ml of the polymeric aluminum silicate-sulphate (or polymeric aluminum sulphate) concentrate was added under stirring at 200 RPM. Stirring was continued for one minute during which a massive floc was formed; the latter was allowed to settle for 15 minutes and filtered on a 1 μm Millipore Filter. The filter cake was recovered and dried under vacuum at 150° C. overnight.

B—Analysis of Silicon Content

Analysis of the Si content in the dried floc cake was performed by X-ray fluorescence at K line of Si using a KEVEX spectrometer.

The standare used for calibration purposes was a powdered mixture containing Alum (99 wt %) and sodium metasilicate (1%).

The resulting Al/Si ratios were found:
for polymeric aluminum sulphate (no silica included): 1.0:0.009
for polymeric aluminum silicate-sulphate (product with silica): 1.0:0.10

(The silica content found with polymeric aluminum sulphate is due to traces of silica in the Alum and silicate ions in the tap water.)

(3) Evidence of silicate incorporation in the polymeric aluminum sulphate compounds (polymeric aluminum silicate-sulphate)

To demonstrate that the silicate species added in process to the polymeric aluminum sulphate compounds to produce polymeric aluminum silicate-sulphate were incorporated into the polymer, rather than dispersed in solution or adsorbed onto the polymers, the following experiments were performed as described below.

The purpose of these experiments was to evaluate the apparent charge (Zeta potential) of the flox resulting from hydrolysis of the filute polymeric aluminum silicate-sulphate, and polymeric aluminum sulphate compounds.

The following systems were examined:
A—polymeric aluminum silicate-sulphate with silicate added "in process"
B—polymeric aluminum sulphate without silicate
C—polymeric alumminum sulphate with silicate added to the dilute floc at the same Al/Si ratio as in "A" above.

The procedure followed may be summarized as:

A—A polymeric aluminum silicate-sulphate with silicate having the composition given in Exammple 2 was prepared and an aliquote was diluted (0.20 mL in 1000 mL) to form a floc under rapid stirring (300 rpm). After one minute stirring, a sample was transferred into a zeta potential measuring device (Malvern Zetasizer) to determine the magnitude of zeta potential of the floc and its variation with time over a period of 20–30 minutes.

B—The procedure in 'A' above was repeated with a sample of a polymeric aluminum sulphate prepared as in 'A', without silicate.

C—The experiment described in 'B' above (polymeric aluminum sulphate without silicate) was repeated and the silicate was added immediately after the dilution step, before the floc started to form.

The following observations were noted:
1. Within one minute, the zeta potential readings were stable and remained virtually constant over a period of 30 minutes.
2. Zeta potential values obtained were:
   (a) polymeric aluminum silicate-sulphate with silicate incorporated 'in-process' 12 mV (positive)
   (b) polymeric aluminum sulphate without silicate 11 mV (positive)
   (c) polymeric aluminum sulphate with silicate added after dilution −11 mV (negative)

The Zeta potential results conclusivity shows that adding the silicate species in a dilute solution of a polymeric aluminum sulphate compound leads to a floc with zero or slightly negative Zeta potential. This is radically different from the situation where the silicate is added 'in-process' leading to a positively charged floc (+12 mV).

Also, the polymeric aluminum silicate-sulphate compound prepared with the silicate added 'in-process' lead to floc with a Zeta potential almost identical to that formed with a polymeric aluminum sulphate (without silicate) compound. This observation confirms that the silicate species must be imbeded into the polymeric aluminum species.

Performance Test

The compound prepared according to Example 2 was tested against Alum in warm and cold water samples taken from the Ottawa river. A first series of samples were cooled to 80° C. and tested using between 3 and 8 ppm $Al_2O_3$ of Alum and the product Example 2. Results are shown in Tables I and II.

TABLE I

| NAME OF PRODUCT | ALUM |
| --- | --- |
| % $Al_2O_3$ | 8.3 |
| Specific gravity | 1.34 |
| RAW WATER: | |
| Source of raw water | Ottawa River |
| pH | 7.2 |
| Alkalinity ($CaCO_3$) | 24 |
| Turbidity (NTU) | 3.7 |
| Temp. at beginning | 8 |
| Temp. at the end | 8 |
| PROCEDURE | |
| Mixing at 100 rpm (Min.) | 3 |
| Mixing at 25 rpm (Min.) | 15 |
| Mixing at 15 rpm (Min.) | 10 |
| Settling (Min.) | 10 |

| Beaker no. | 1 | 2 | 3 | 4 | 5 | 6 |
| --- | --- | --- | --- | --- | --- | --- |
| (ul) | 27 | 36 | 45 | 54 | 63 | 72 |
| $Al_2O_3$ ppm | 3 | 4 | 5 | 6 | 7 | 8 |
| App. Pin.Floc (Min.) | 3 | 3 | 2.8 | 2.5 | 2.5 | 2.1 |
| Size at 7 min. | 1 | 1 | 1.5 | 1.5 | 1.5 | 1.5 |
| Size at 15 min. | 1.5 | 1.5 | 2 | 2 | 2 | 2 |
| Size at 25 min. | 1.5 | 1.5 | 2 | 2 | 2 | 2 |
| Position at 20-25 min. | D | D | D | D | D | D |
| Additional information | | | | | | |
| pH | 6.56 | 6.48 | 6.27 | 6.08 | 5.75 | 5.41 |
| Alkalinity | 17 | 16 | 13 | 9 | 8 | 6 |
| Turbidity | 3 | 2.9 | 2.3 | 2.4 | 3.8 | 4.2 |

D = Dispersed,
C = Centered.

TABLE II

| PRODUCT | (Example 2) |
| --- | --- |
| % $Al_2O_3$ | 7.5 |
| Spec. gravity | 1.207 |
| RAW WATER: | |
| Source of raw water | Ottawa River |
| pH | 7.2 |
| Alkalinity ($CaCO_3$) | 24 |
| Turbidity (NTU) | 3.7 |
| Temp. at beginning °C. | 8 |
| Temp. at the end °C. | 9 |
| PROCEDURE: | |
| Mixing at 100 rpm (Min.) | 3 |
| Mixing at 25 rpm (Min.) | 15 |
| Mixing at 15 rpm (Min.) | 10 |
| Settling (Min.) | 10 |

| No. Beaker | 1 | 2 | 3 | 4 | 5 | 6 |
| --- | --- | --- | --- | --- | --- | --- |
| (ul) | 33 | 44 | 55 | 66 | 77 | 88 |
| $Al_2O_3$ ppm | 3 | 4 | 5 | 6 | 7 | 8 |
| App. Pin.Floc (Min.) | 10 | 2.6 | 1.5 | 1.1 | 1 | 1 |
| Size at 7 min. | 0 | 1.5 | 1.5 | 2 | 2 | 2 |
| Size at 15 min. | 0 | 2 | 2 | 2.5 | 2.5 | 2 |
| Size at 25 min. | 0 | 2 | 2 | 2.5 | 2.5 | 2.5 |
| Position at 20-25 min. | 1 | D | D | D | D | D |
| pH | 7 | 6.93 | 6.84 | 6.75 | 6.7 | 6.65 |
| Alkalinity | 22 | 21 | 18 | 17 | 16 | 14 |
| Turbidity | 5 | 1.3 | 0.8 | 0.68 | 0.51 | 0.53 |

D = Dispersed,
C = Centered.

As it can be seen, the use of the product of Example 2 represents a remarquable improvement over Alum, especially in cold water with initially high turbidity and low alkalinity. The results also show that Alum does not work effectively at the lowest turbidity of 2.3 NTU at 5 ppm $Al_2O_3$. In these conditions, the results obtained with the product of the present invention are well above acceptable levels. The product of Example 2 shows a turbidity of 0.8 NTU at 5 ppm $Al_2O_3$ and the turbidity continues to decrease to 0.51 NTU as the dosage of $Al_2O_3$ is increased to 7 ppm.

A typical problem with Alum in treatment of cold, low alkalinity water is the incomplete hydrolysis of aluminum sulphate to aluminum hydroxide, thereby requiring high dosages. Alum will often enter into the drinking water system as soluble aluminum sulphate. Therefore, an activated silica treatment as used commonly with Alum in order to compensate for its slower rate of hydrolysis may be reduced or completely eliminated. In the case of the product of Example 2, silica is already contained in the polymer and its rate of hydrolysis and floc size will be quite sufficient to prevent soluble aluminum compounds from entering the treated drinking water supply.

A second series of tests was performed using St-Lawrence water river at a temperature of 25° C. and tested using between 3 and 8 ppm of $Al_2O_3$ of Alum and the compound of Example 2. Results are summarized in Table III and IV.

TABLE III

| PRODUCT | ALUM |
| --- | --- |
| % $Al_2O_3$ | 8.3 |
| Specific gravity | 1.34 |
| RAW WATER: | |
| Source of raw water | St-Lawrence River |
| pH | 7.76 |
| Alkalinity ($CaCO_3$) | 50 |
| Turbidity (NTU) | 2 |
| Colour | 15 |
| Temp. at beginning | 25 |

TABLE III-continued

| Temp. at the end | | | 25 | | | |
|---|---|---|---|---|---|---|
| PROCEDURE | | | | | | |
| Mixing at 100 rpm (Min.) | | | 3 | | | |
| Mixing at 25 rpm (Min.) | | | 15 | | | |
| Mixing at 15 rpm (Min.) | | | 10 | | | |
| Settling (Min.) | | | 10 | | | |
| Beaker No. | 1 | 2 | 3 | 4 | 5 | 6 |
| (uL) | 27 | 36 | 45 | 54 | 63 | 72 |
| Al$_2$O$_3$ ppm | 3 | 4 | 5 | 6 | 7 | 8 |
| App. Pin.Floc (Min.) | 3 | 3 | 3 | 3 | 2.3 | 2.1 |
| Size at 7 min. | 1 | 1 | 1.5 | 1.5 | 1.5 | 1.5 |
| Size at 15 min. | 1.5 | 1.5 | 2 | 2 | 2 | 2 |
| Size at 25 min. | 1.5 | 1.5 | 2 | 2 | 2 | 2 |
| Position at 20-25 min. | D | D | D | D | D | D |
| Additional information | | | | | | |
| pH | 7.23 | 7.14 | 7.09 | 6.9 | 6.81 | 6.67 |
| Alkalinity | 42 | 38 | 35 | 32 | 30 | 27 |
| Turbidity | 0.46 | 0.39 | 0.29 | 0.2 | 0.21 | 0.18 |

D = Dispersed
C = Centered

TABLE IV

| PRODUCT | | | (Example 2) | | | |
|---|---|---|---|---|---|---|
| % Al$_2$O$_3$ | | | 7.5 | | | |
| Specific gravity | | | 1.207 | | | |
| RAW WATER: | | | | | | |
| Source of raw water | | | St-Lawrence River | | | |
| pH | | | 7.76 | | | |
| Alkalinity (CaCO$_3$) | | | 50 | | | |
| Turbidity (NTU) | | | 2 | | | |
| Temp. at beginning °C. | | | 25 | | | |
| Temp. at end °C. | | | 25 | | | |
| PROCEDURE: | | | | | | |
| Mixing at 100 rpm (Min.) | | | 3 | | | |
| Mixing at 25 rpm (Min.) | | | 15 | | | |
| Mixing at 15 rpm (Min.) | | | 10 | | | |
| Settling (Min.) | | | 10 | | | |
| No. of beaker | 1 | 2 | 3 | 4 | 5 | 6 |
| (uL) | 33 | 44 | 55 | 66 | 77 | 88 |
| Al$_2$O$_3$ ppm | 3 | 4 | 5 | 6 | 7 | 8 |
| App. Pin. Floc (Min.) | 10 | 6 | 3 | 1.6 | 1.3 | 1.1 |
| Size at 7 min. | 0 | 1 | 1.5 | 2 | 2 | 2 |
| Size at 15 min. | 0 | 1 | 2 | 2.5 | 2.5 | 2.5 |
| Size at 25 min. | 0 | 2.5 | 4 | 4 | 4 | 4 |
| Position at 20-25 min. | I | D | CD | CD | CD | CD |
| pH | 7.38 | 7.34 | 7.28 | 7.22 | 7.2 | 7.14 |
| Alkalinity | 44 | 43 | 42 | 40 | 39 | 38 |
| Turbidity | 3.6 | 1.3 | 0.89 | 0.56 | 0.44 | 0.28 |

D = Dispersed,
C = Centered.

It can be seen that Alum is somewhat more effective than the product of Example 2 in terms of final turbidity readings for given dosages of Al$_2$O$_3$. The final turbidity readings are lower because of the fact that the water to be treated is more alkaline (50 ppm CaCo$_3$) and this favors a more rapider hydrolysis of Alum. However, it is possible to overcome these differences by reading the basicity of the product of Example 2 to a value between 40 and 45%.

We claim:

1. An aqueous solution comprising a basic polynucleate aluminum hydroxy silicate-sulphate compound having a composition of the formula:

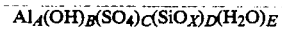

wherein A is 1.0, B ranges from 0.75 to 2.0, C ranges from 0.3 to 1.12, D ranges from 0.005 to 0.1, X is greater than 2.0 but less than or equal to 4.0 such that 3=B+2C+2D (X−2), and E is larger than 4.

2. The product of claim 1, wherein
B=1.2-1.8
C=0.53-0.90
D=0.033-0.070
X is greater than 2.0 but less than or equal to 3.0.

3. The product of claim 1, wherein
B=1.5
C=0.735
D=0.050
X=2.311.

4. The solution of claim 1, wherein said solution contains 7-10 wt. % of said compound calculated as Al$_2$O$_3$.

5. The solution of claim 1, wherein the basicity of the solution is defined by B/3A X 100 and said basicity is 25-66%.

6. The solution of claim 5, wherein said basicity is 40-60%.

7. A process for preparing an aqueous solution comprising a basic polynucleate aluminum hydroxy silicate-sulphate solution having a composition of the formula:

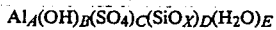

wherein A is 1.0; B ranges from 0.75 to 2.0; C ranges from 0.3 to 1.12; D ranges from 0.005 to 0.1; X is greater than 2.0 but less than or equal to 4.0 such that 3=B+2C+2D (X−2); and E is larger than 4, which comprises the steps of:
mixing an alkali metal silicate solution into an aluminum sulphate solution to form a mixture, and
reacting said mixture with an alkali metal aluminate solution under high shear mixing conditions to produce said aluminum hydroxy silicate-sulphate solution having said composition.

8. The process of claim 7, wherein the alkali metal silicate is sodium silicate and wherein the alkali metal silicate is sodium aluminate.

9. The process of claim 7, wherein the alkali metal silicate is mixed with said aluminum sulphate solution at a temperature ranging from 10° to 35° C. and wherein the alkali metal aluminate is subsequently added to the mixture at a temperature ranging from 10° to 35° C., and wherein the resulting mixture is subsequently heated at a temperature ranging from 50° to 90° C.

10. The process of claim 9, wherein the alkali metal silicate is sodium silicate and wherein the alkali aluminate is sodium aluminate.

11. The process of claim 7, wherein the basicity of said basic polynucleate aluminum hydroxy silicate-sulphate solution is defined as B/3A X 100 and said basicity is 25-66%.

12. The process of claim 11, wherein said basicity is 40-60%.

13. The process of claim 7, wherein said basic polynucleate aluminum hydroxy silicate sulphate solution is 7-10 wt. % in Al$_2$O$_3$.

14. The process of claim 7, wherein the solution is clarified following said high shear mixing step.

15. A method of flocculating/coagulating/precipitating suspended or dissolved solids in an aqueous system, comprising the steps of:
adding the basic polynucleate aluminum hydroxy silicate-sulphate solution of claim 1 to said aqueous system, and
flocculating/coagulating/precipitating said solids.

* * * * *